United States Patent
Perks et al.

(10) Patent No.: US 7,191,196 B2
(45) Date of Patent: Mar. 13, 2007

(54) METHOD AND SYSTEM FOR MAINTAINING FORWARD AND BACKWARD COMPATIBILITY IN FLATTENED OBJECT STREAMS

(75) Inventors: Michael Albert Perks, Austin, TX (US); Sean Michael Sundberg, Waco, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 09/894,096

(22) Filed: Jun. 28, 2001

(65) Prior Publication Data

US 2003/0005169 A1    Jan. 2, 2003

(51) Int. Cl.
*G06F 17/30* (2006.01)
(52) U.S. Cl. .............................. 707/203; 707/202
(58) Field of Classification Search ............. 707/6, 707/103 R, 103 Y, 203, 202; 345/619; 717/108; 719/330
See application file for complete search history.

(56) References Cited

U.S. PATENT DOCUMENTS

| 5,499,365 | A | * | 3/1996 | Anderson et al. | ........... | 707/203 |
| 6,298,353 | B1 | * | 10/2001 | Apte | ...................... | 707/103 R |
| 6,301,585 | B1 | * | 10/2001 | Milne | ...................... | 707/103 R |
| 6,477,701 | B1 | * | 11/2002 | Heistermann et al. | ...... | 717/108 |

* cited by examiner

*Primary Examiner*—Apu M. Mofiz
(74) *Attorney, Agent, or Firm*—Joseph R. Burwell; Herman Rodriguez; Leslie Van Leeuwen

(57) ABSTRACT

A method, a system, an apparatus, and a computer program product are presented for object-oriented management of serializable objects. An object has a set of attributes and a class version number, which identifies the object as an instance of a specific version of a class. In addition, each attribute in the object has an attribute version number, which may represent a version of a class in which the associated attribute was initially declared within the class. The object may be serialized into a data stream, and the data stream has the class version number of the object, an attribute value for each attribute in the set of attributes, and an attribute version number for each attribute in the set of attributes. The data stream may also have a class identifier for the class of the object and an attribute count for the set of attributes into the data stream.

11 Claims, 7 Drawing Sheets

METHOD AND SYSTEM FOR MAINTAINING FORWARD AND BACKWARD COMPATIBILITY IN FLATTENED OBJECT STREAMS

BACKGROUND OF THE INVENTION

1. Field of the Invention

The present invention relates to an improved data processing system and, in particular, to a method and apparatus for object-oriented input/output, data storage, or communication. Still more particularly, the present invention provides a method and apparatus for version management of serialized object streams.

2. Description of Related Art

While executing an object-oriented application, objects are created and then destroyed or otherwise freed; in a Java™ runtime environment, objects are eventually freed through garbage collection. In certain applications, rather than saving runtime data in persistent storage and then recreating objects, it is helpful to persist actual objects outside of the runtime environment. The object is then stored in persistent storage or communicated to another process or device.

Using object serialization, an object can be persisted and then reused. Object serialization is the process of saving an object's state to a sequence of bytes as well as the process of rebuilding those bytes into a live object, although the latter is sometimes called "deserialization". The complete state of an object can be written to an output stream, and at some later time, the object can be recreated by reading its serialized state from an input stream. Using a three-dimensional analogy for an object, a serialized object is often called a "flattened" object, while a recreated object is sometimes called an "inflated" object.

Java™ provides default mechanisms for persisting objects. As long as an object implements the "Serializable" interface or has a class within its hierarchy that implements the interface, an object can be serialized; a Java™ class can specify which attributes are not to be serialized/deserialized using the special Java™ keyword "transient". The "Serializable" interface does not define any methods but merely acts as a marker that indicates whether serialization is allowed on a given object. An object can by serialized by passing the object to the "writeObject( )" method of the "ObjectOutputStream" class, and the object can be recreated by calling the "readObject( )" method of the "ObjectInputStream" class. This serialization behavior can be customized to a certain extent by implementing the "writeObject( )" and "readObject( )" methods while still being able to rely on the default output and input mechanisms for writing and reading a flattened object.

Instead of relying on the default mechanism, one can create a custom serialization mechanism by implementing the "Externalizable" interface, which defines only two methods, "writeExternal( )" and "readExternal( )". By overriding these methods, one has complete control over the writing and reading of an object's state. When a class implements the "Externalizable" interface, the "ObjectOutputStream" and "ObjectInputStream" classes use that class's "writeExternal( )" and "readExternal( )" methods to write and read the object's state to and from a flattened object stream.

One potential problem with serializing an object is that a flattened object might persist within a file for a long period of time. Meanwhile, classes may change over time such that multiple versions of a class are used while the flattened object remains in persistent storage. When an attempt is made to read the flattened object, an error could occur because the version of the class that is being used to read the flattened object is not compatible with the version of the class that was being used when the object was flattened.

The Java™ environment contains some administrative support for detecting class versioning problems. When an object is serialized, information about an object's class is also serialized so that the correct class can be loaded when the object is deserialized. Generally, this information comprises the fully-qualified name of the class; in addition, all persistent-capable classes are given a version number. The version number of a class is stored in a field named "serialVersionUID", and the version number is used to determine whether an object can be properly deserialized; if there is a version mismatch, the "java.io.InvalidClassException" will be thrown.

If one needs to control class versioning, one can explicitly declare the "serialVersionUID" constant and ensure that it remains the same between compatible versions of a class; it should be assumed that one would not maintain the same "serialVersionUID" constant across changes to a class that break serialization compatibility. If a class does not define a "serialVersionUID" constant, then the "ObjectOutputStream" class automatically generates a unique version number for the class by applying a hashing algorithm to information related to the class, such as the class name, its interfaces, fields, and methods. Changes that break serialization compatibility can then be detected through the "serialVersionUID" constant. For example, if a non-private class method signature is changed in a new version of the class, then the automatically-computed unique version number would also change, and an exception would be thrown when an attempt was made to read a flattened object stream into an incompatible version of the object.

Although the administrative support for detecting class versioning problems is helpful to some extent, it does not provide any mechanism for recovery from this incompatibility in class versions.

Therefore, it would be advantageous to have a methodology for facilitating object serialization and deserialization such that forward and backward compatibility can be maintained for flattened objects across different versions of a class.

SUMMARY OF THE INVENTION

A method, a system, an apparatus, and a computer program product are presented for object-oriented management of serializable objects. Within object-oriented programming languages, classes define a set of attributes and methods, which provide the state and behavior for instances of that class. For the purposes of this invention, the class would also define a class version number attribute that would serve to identify an object as an instance of a particular class version. In addition, each attribute in the set of attributes is associated with an attribute version number. The attribute version number represents the class version in which the associated attribute was first declared within the class. When an object is written to a data stream, all of the information contained within that object would be written. The information written to the stream would consist of a value identifying the object's class, the value of the class version attribute, a count of all of the non-transient attributes defined within the object, and every attribute along with its associated version number.

At some subsequent point in time, the data stream representing a serialized object may be read. An object will be instantiated in accordance with the class identifier from the data stream, at which point the class version number of the instantiated object and the class version number of the serialized object may differ. Serialized attribute values from the data stream are stored within the instantiated object in accordance with the class version number and attribute version number relationships between the serialized object and the instantiated object.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to a system and a methodology for facilitating object serialization and deserialization such that forward and backward compatibility can be maintained for flattened objects across different versions of a class. These flattened objects may be persisted in one or more files that are dispersed throughout a network, or the flattened objects may be communicated between devices within a network. As background, a typical organization of hardware and software components within a distributed data processing system is described prior to describing the present invention in more detail.

Figure 1A:
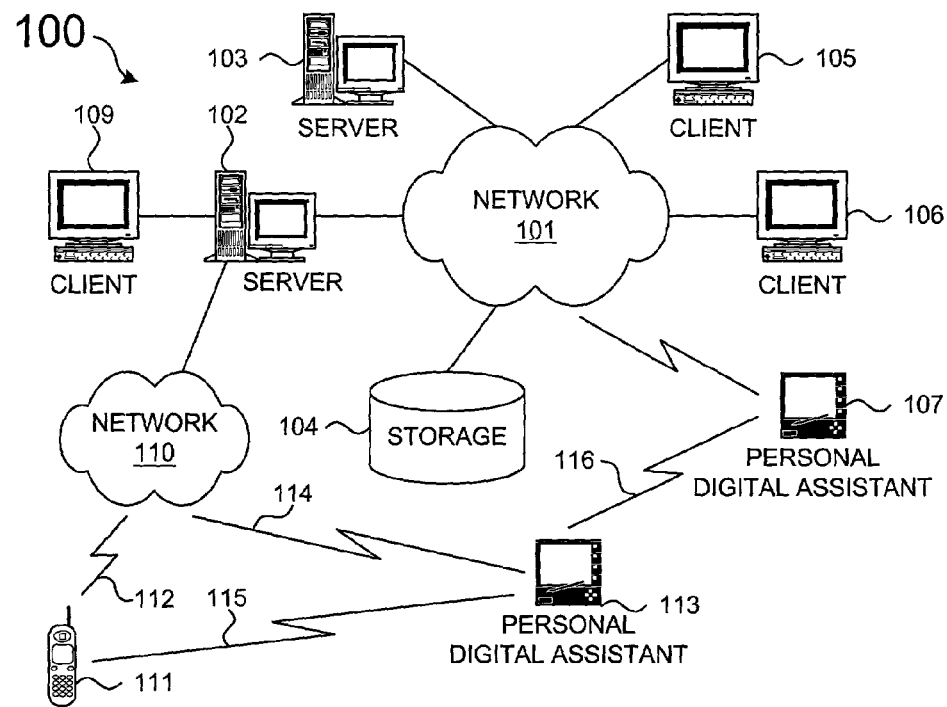
FIG. 1A depicts a typical distributed data processing system in which the present invention may be implemented.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
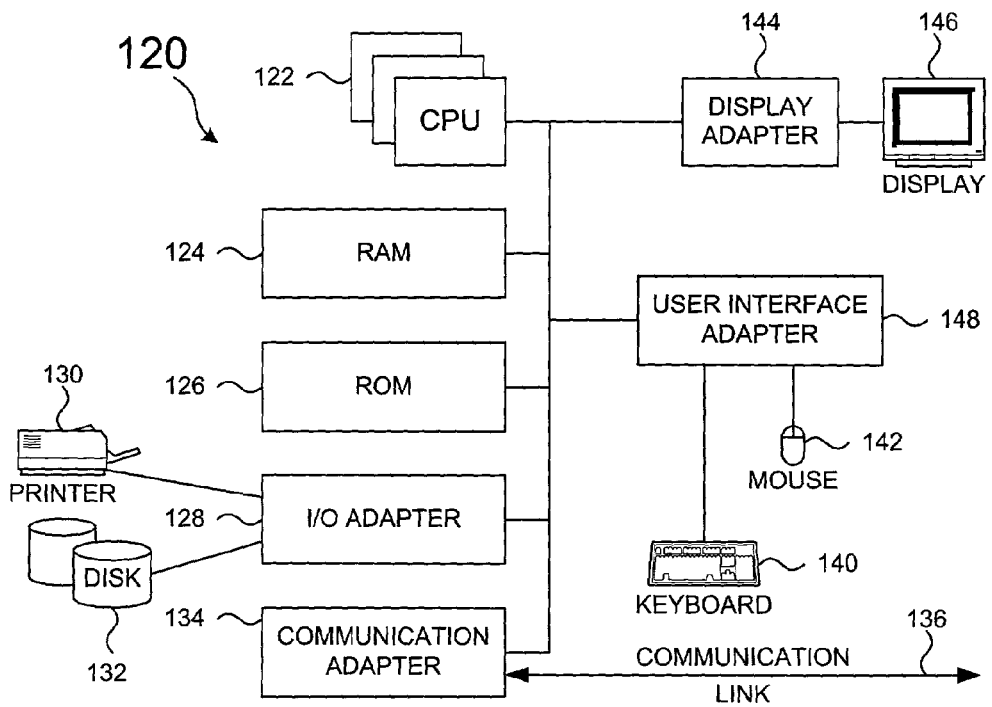
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP)

and other types of special purpose processors, and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix™ operating system, while another device contains a simple Java™ runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a system and a methodology for facilitating object serialization and deserialization such that forward and backward compatibility can be maintained for flattened objects across different versions of a class.

For the purposes of this invention, Java™ is used as the programming language to describe the problem and present the preferred embodiment. However, this invention is not restricted to the Java™ programming language and could be implemented in any environment that serializes and deserializes object instances.

In general, a serialization compatibility problem is created when an attribute is added to a class. The present invention solves certain serialization compatibility issues by associating a version number or identifier to each attribute. During serialization and deserialization, version numbers of each attribute are compared. For forward compatibility, i.e., when a newer class attempts to read older class data, the older class data is read in a manner that is determined by its version number while new attributes within the newer version are provided default values. For backward compatibility, i.e., when an older class attempts to read newer class data, newer attributes can be ignored. It should be noted that the examples discuss version numbers, but one of ordinary skill in the art would understand that various type of identifiers, including numbers, could also be used. The methodology is hereinafter described in more detail with respect to the remaining figures.

Figure 2A:
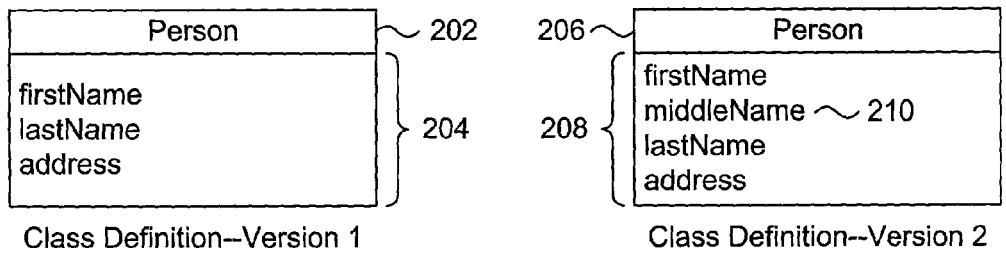
FIG. 2A is a diagram showing a simple Person class that might be found in the prior art.

With reference now to FIG. 2A, a diagram shows a simple Person class that might be found in the prior art. FIG. 2A contains a representation of two versions of the Person class. For the following examples, these two versions of the Person class will be used to demonstrate typical serialization and deserialization versus the manner in which the present invention performs serialization and deserialization.

A preliminary Version 1 of the Person class 202 has a preliminary set of attributes 204. A subsequent Version 2 of the Person class 206 has a modified set of attributes 208 that includes an additional attribute that has been added to the class definition, "middleName" attribute 210. In FIG. 2A, the attributes are shown without values.

Figure 2B:
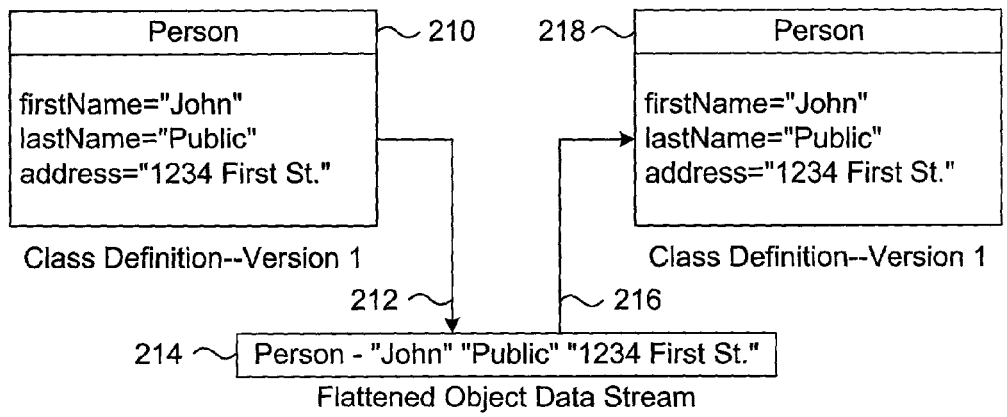
FIGS. 2B–2C are diagrams depicting the operation of a standard serialization mechanism on two versions of the Person class in which the same version of the class is used for both serialization and deserialization.
Figure 2C:
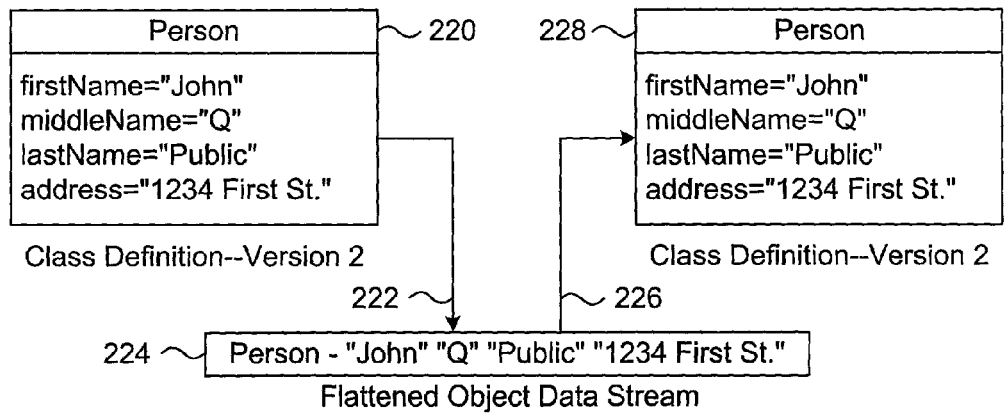

With reference now to FIGS. 2B–2C, a set of diagrams show the operation of a standard serialization mechanism on two versions of the Person class in which the same version of the class is used for both serialization and deserialization. In FIGS. 2B–2C, the attributes are associated with values, which represent the actual value given to the attributes of the class instance (or object).

FIG. 2B shows object 210, which is structured in accordance with Version 1 of the Person class. Object 210 undergoes serialization operation 212 to create flattened object data stream 214. Data stream 214 then undergoes deserialization operation 216 to inflate object 218, which can be seen to be a copy of the original object 210.

Data stream 214 is an abstraction of the actual destination of the serialized object and is not a byte-wise copy of an actual serialized object. The flattened object data stream can be formatted in many ways that may be dependent upon a variety of factors with respect to the runtime environments, the reading/writing applications, etc., that use the object data stream. Data stream 214 represents a file, a network connection through which the object is transmitted to another computer, or possibly a memory location where the object is held.

FIG. 2C shows object 220, which is structured in accordance with Version 2 of the Person class. Object 220 undergoes serialization operation 222 to create flattened object data stream 224. Data stream 224 then undergoes deserialization operation 226 to inflate object 228, which can be seen to be a copy of the original object 220.

The simplest and most frequent scenario for serializing an object occurs when the version of the class that is read out of the stream is the same as the version that was written. This scenario, as it would appear using the standard serialization mechanism, is represented in FIGS. 2B–2C. As the figures show, when the object is serialized, information that identifies the object's class and the value of the object's attributes are placed into the object stream. When the object is deserialized, the class identifier is read, and an object is instantiated in accordance with the identified class. The object is then initialized with the attribute values as they are read out of the stream.

Figure 3A:
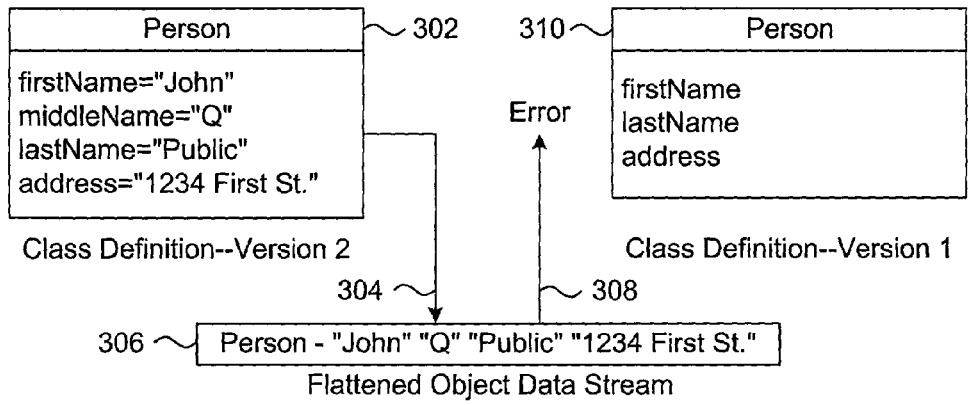
FIGS. 3A–3B are diagrams depicting the operation of a standard serialization mechanism on two versions of the Person class in which a different version of the class is used for serialization and deserialization on the same object stream.
Figure 3B:
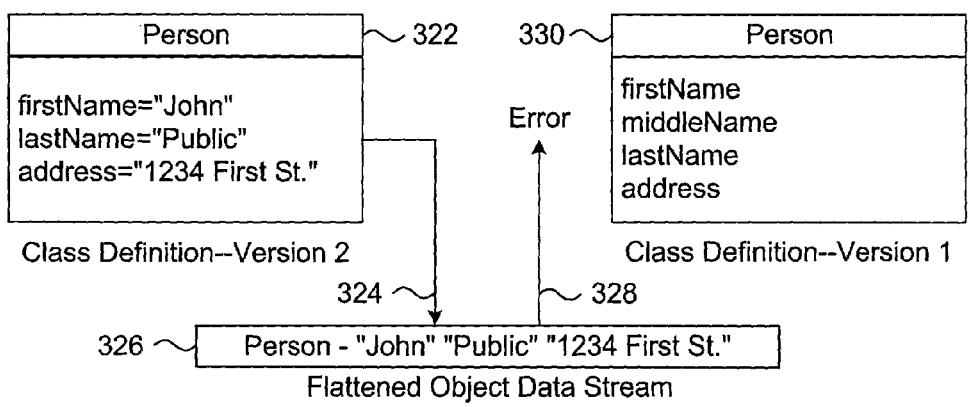

With reference now to FIGS. 3A–3B, a set of diagrams show the operation of a standard serialization mechanism on two versions of the Person class in which a different version of the class is used for serialization and deserialization on the same object stream. While the standard serialization mechanism is very simple and straightforward, it has an inherent problem when confronted with operating on different versions of a class. FIGS. 3A–3B display two scenarios in which default serialization operations result in an error.

FIG. 3A shows an instance of a newer version of a class that is written to the data stream and a back-level version that is available when the information is read out of the stream. This type of scenario might occur when an application on the receiving end of a serialization stream has not been updated with a modified version of a class. Object 302 is structured in accordance with Version 2 of the Person class and undergoes serialization operation 304 to create flattened object data stream 306. However, when data stream 306 then undergoes deserialization operation 308 in an attempt to instantiate object 310, which is structured in accordance with Version 1 of the Person class, an error would be detected, and the deserialization operation would not be completed.

FIG. 3B shows a similar situation in which an older version of the class is written to the data stream, and when the data is read out of the data stream, an attempt is made to instantiate an object in accordance with a more recent version of the object's class. This type of scenario might occur when an application on the writing or transmitting end of a serialization stream has not been updated with the most recent version of a class, yet the receiving application has been updated. Object 322 is structured in accordance with Version 1 of the Person class and undergoes serialization operation 324 to create flattened object data stream 326. However, when data stream 326 then undergoes deserialization operation 328 in an attempt to instantiate object 330, which is structured in accordance with Version 2 of the Person class, an error would be detected and the deserialization operation would not be completed.

In both scenarios in FIG. 3A and FIG. 3B, the serialization fails when the object data is read out of the data stream because the information contained within the data stream is structured differently than expected. While these scenarios do not occur in the usual operation of an application, they may occur at any time after updates are made to objects that are being serialized. Distributed applications, i.e., those applications in which a part of the application runs on one computer and another part runs elsewhere, are particularly susceptible to this serialization problem since most of their communication may comprise object streams. To remedy the situation, costly and time-consuming updates are required to the application on every system in order to avoid the serialization errors using the standard serialization mechanism.

With reference now to FIGS. 4A–4D, a set of diagrams show the operation of a custom serialization mechanism for versions of the exemplary Person class in accordance with the present invention. The custom serialization mechanism of the present invention corrects the versioning problems described above with respect to FIGS. 3A–3B by associating additional information with attributes in the stream. FIGS. 4A–4D displays the same scenarios as above except that the serialization mechanism of the present invention is used to flatten and inflate the objects. In addition to each class receiving a version number, as is performed in the prior art, each attribute is also given a version number to identify the class version in which the attribute first appeared.

The values preceding the attributes in the data stream within parentheses are the version numbers. Again, the examples merely represent data streams and are not bytewise copies of actual data streams.

In the present invention, when an object is written to a flattened object data stream, attribute version numbers are also placed in the data stream in addition to the class version number. When the object is later read from the data stream, the attribute version number is compared to the current class version number of the newly created object and not to the class version number from the data stream. Only those attributes that are usable within the current class version are used for the new object. If the object that is instantiated when the class identifier is read from the stream is of a newer class version than the class version of the object that was serialized into the stream, then any new attributes are initialized to a default value.

Figure 4A:
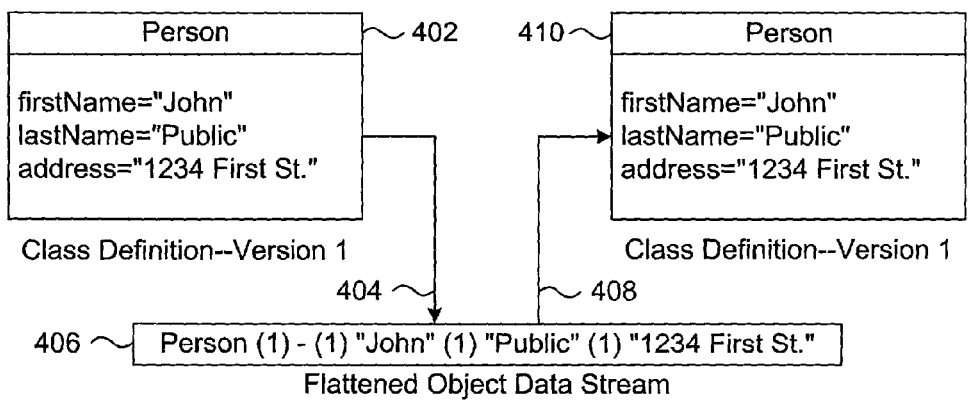
FIGS. 4A–4D are diagrams depicting the operation of a custom serialization mechanism for versions of the exemplary Person class in accordance with the present invention.

FIG. 4A shows object 402, which is structured in accordance with Version 1 of the Person class. Object 402 undergoes serialization operation 404 to create flattened object data stream 406. At some later point in time, data stream 406 then undergoes deserialization operation 408 to inflate newly instantiated object 410, which can be seen to be a copy of the original object 402.

Figure 4B:
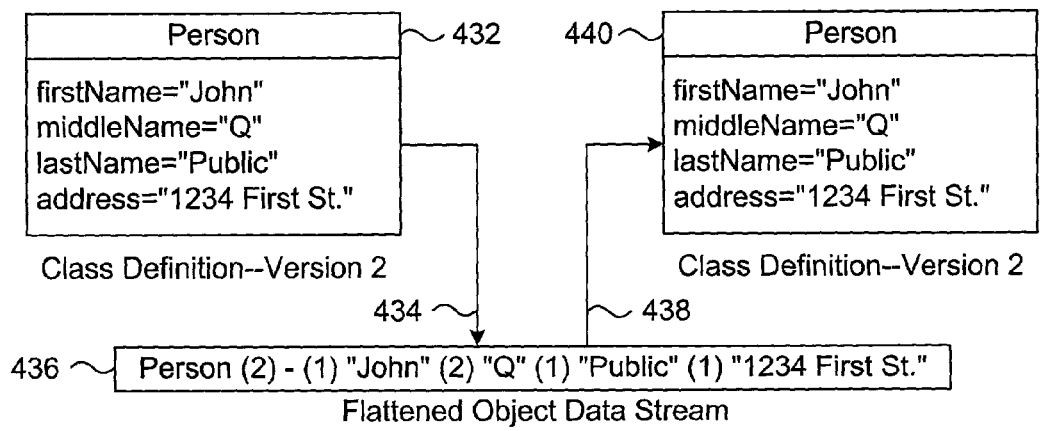

FIG. 4B shows object 432, which is structured in accordance with Version 2 of the Person class. Object 432 undergoes serialization operation 434 to create flattened object data stream 436. At some later point in time, data stream 436 then undergoes deserialization operation 438 to inflate newly instantiated object 440, which can be seen to be a copy of the original object 432.

Figure 4C:
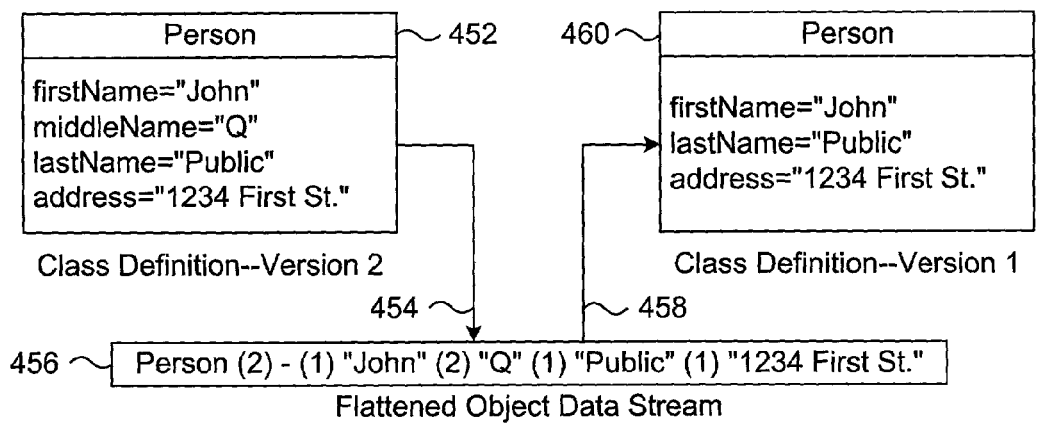

FIG. 4C shows object 452, which is structured in accordance with Version 2 of the Person class, which includes the "middleName" attribute that was introduced in Version 2 of the Person class but did not exist in Version 1 of the Person class. Object 452 undergoes serialization operation 454 to create flattened object data stream 456. At some later point in time, data stream 456 then undergoes deserialization operation 458 in an attempt to read the attribute values into newly instantiated object 460. However, the receiving/reading application has instantiated object 460 as an object of Version 1 of the Person class, whereas data stream 456 was created by flattening an object of Version 2 of the Person class. When the "middleName" attribute is encountered, its Version 2 tag is detected to be greater than the version of the object into which it is being read, and the attribute value is ignored with respect to object 460.

Although in the case of FIG. 4C some information is lost, the receiving/reading application was not expecting the information, so from the perspective of that application, no information is lost. In addition, no error occurs upon detecting a version mismatch.

Figure 4D:
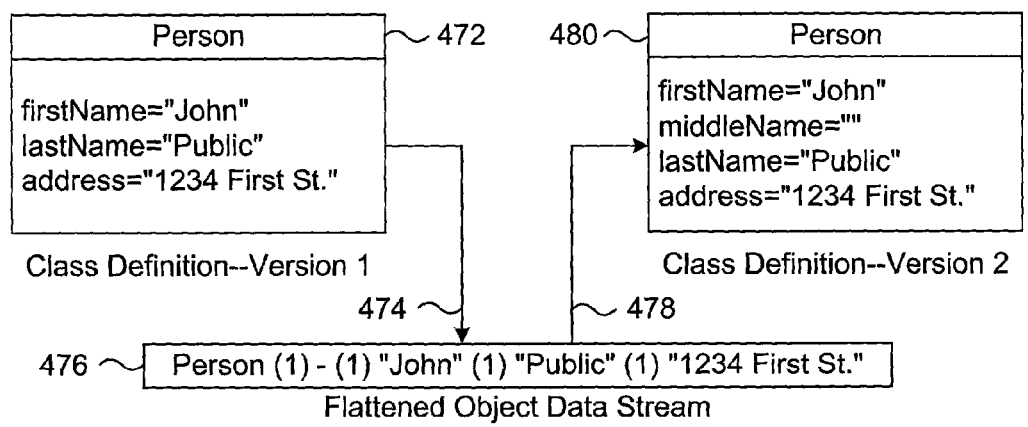

FIG. 4D shows object 472, which is structured in accordance with Version 1 of the Person class, which does not include the "middleName" attribute because it was introduced in Version 2 of the Person class and did not exist in Version 1 of the Person class. Object 472 undergoes serialization operation 474 to create flattened object data stream 476. At some later point in time, data stream 476 then undergoes deserialization operation 478 in an attempt to read the attribute values into newly instantiated object 480. However, the receiving/reading application has instantiated object 480 as an object of Version 2 of the Person class, whereas data stream 476 was created by flattening an object of Version 1 of the Person class. The "middleName" attribute of object 480 is associated with a Version 2 tag, which is detected to be greater than the version of the object from which the data stream is being read, and the attribute value is given a default value. The deserialization object may then proceed to read attribute value from the data stream for the other attributes of object 480 without further interference.

Although in the case of FIG. 4D some information is not received that might be received in other scenarios, the receiving/reading application should be able to proceed because all attributes have a valid value. This situation should be tolerable because the attribute that received the default value did not exist in the previous version of the class; therefore, the attribute value should not be regarded as critical. In other words, if the first version of the class was acceptable, then subsequent versions of the class should be tolerable, and the application developer should keep such potential restrictions in mind when modifying class definitions. The present invention solves a problem that exists within the prior art because no error occurs upon detecting a version mismatch. If the application developer or user desires to be notified when a version mismatch is detected, then an error message of some form can be generated or logged. In addition, a dialog box could be presented if the application has a graphical user interface, and the user of the application might be given an option of proceeding or halting when a version mismatch is detected.

Figures 5, 6A:
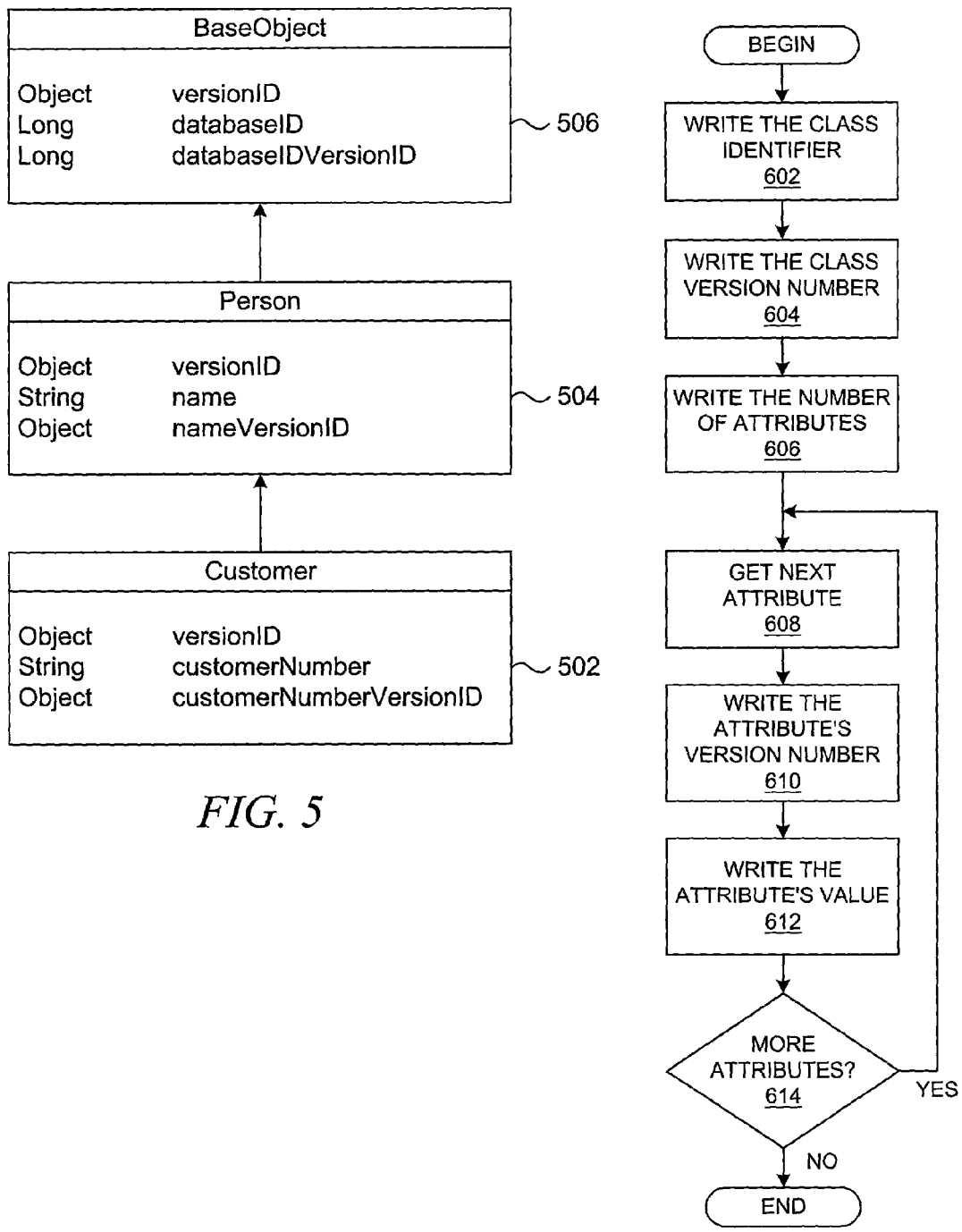
FIG. 5 depicts a simple object model with a set of classes for illustrating an object-oriented methodology that supports serialization and deserialization with version management in accordance with a preferred embodiment of the present invention.
FIG. 6A is a flowchart depicting a serialization process in accordance with a preferred embodiment of the present invention.

With reference now to FIG. 5, a simple object model depicts a set of classes for illustrating an object-oriented methodology for supporting serialization and deserialization with version management in accordance with a preferred embodiment of the present invention. In the preferred embodiment, each class is responsible for serializing and deserializing its own attributes. While most of this logic can be placed in a common superclass, the implementation classes must provide the logic pertaining to the specifics of their own attributes.

FIG. 5 depicts a simple object model. Customer class 502 is a subclass of Person class 504, which is a subclass of BaseObject class 506. Each class defines a versionID attribute that contains the version identifier for the particular class. Each class then defines its instance attributes, i.e., the attributes that pertain to the business function of the class. Each instance attribute is paired with another attribute that represents the attribute's version information. The naming convention for the version attributes that has been used within this example is to append "VersionID" to the paired instance attribute's name. For example, the BaseObject class defines an instance attribute named "databaseID"; following the naming convention, the version attribute that is associated with attribute "databaseID" is named "databaseIdVersionID".

In the preferred embodiment of the present invention, each Java™ class implements the "writeObject( )" and "readObject( )" methods to perform the object serialization and deserialization.

Within these methods, each class is responsible for writing and reading their attributes to and from a flattened object data stream. For example, from the class representation in FIG. 5, the Customer class writes and reads the contents of the "customerNumber" attribute to and from the data stream but does take any actions to serialize or deserialize the "name" and the "databaseID" attributes in the other classes. The serialization of the "name" and "databaseID" attributes is left to the classes in which those are defined, namely Person and BaseObject, respectively.

In accordance with standard Java™ serialization methodology, when an object is serialized, the "writeObject( )" method of the object's class would be invoked, which would receive the stream instance as an input argument so that the object's contents can be placed in the stream. However, with the present invention, when the "writeObject( )" method is called, as a first action, the method invokes the "writeObject( )" method of its superclass, which ensures that the superclass' attributes are placed in the stream; all of the attributes of the superclass (or superclasses) are placed into the stream until the base class is reached.

Next, the methodology described above with respect to FIGS. 4A–4D is performed so that the object's attribute information is written to the stream. Every instance attribute written to the stream is an Object. No Java™ primitive data types are written to the stream so that every attribute in the stream can be handled generically. For example, assume that an instance of the Customer class is serialized to the flattened object data stream. After invoking the superclass "writeObject( )" method, which in this case would be the "writeObject( )" method for the Person class, which in turn would invoke the "writeObject( )" method of the BaseObject class, the "writeObject( )" method defined by the Customer class would: (1) write the value of the Customer class' "versionID" object; (2) write the attribute count of the Customer class, which in this case is equal to one; (3) write the value of "customerNumberVersionID"; and (4) write the value of the "customerNumber" attribute.

When an object is deserialized, the "readObject( )" method would be invoked with a stream instance containing a flattened object data stream for the serialized object. Similar to the operations that occur during serialization, with the present invention, when the "readObject( )" method is called, as a first action, the method invokes the "readObject( )" method of its superclass, which insures that the superclass' attributes are retrieved from the stream.

Next, the methodology described above with respect to FIGS. 4A–4D for deserializing an object is performed so that the object's attribute information is read from the stream. Continuing with the example of using the Customer class, after invoking the "readObject( )" method on the superclass, which in this case would be the "readObject( )" method for the Person class, the Customer class' "versionID" attribute and the attribute count would be read from the data stream. Based on the attribute count, each version attribute and instance attribute are read from the stream. Because the order in which the attributes have been written is known, i.e., there is an implicit ordering to manner in which the attributed values are placed into and read from the data stream, the values that are read from the stream can be mapped to the attributes defined by the class.

With reference now to FIG. 6A, a flowchart depicts a serialization process in accordance with a preferred embodiment of the present invention. At some point in time, a "writeObject( )" method is invoked to serialize an object into a particular flattened object data stream, as described with respect to FIG. 5 above; it may be assumed that the "writeObject( )" method for the object's superclass has already been invoked, which would have invoked the "writeObject( )" method of its superclass and so on until the BaseObject class has been reached such that all of the attributes of the superclasses are placed into the stream. The serialization process begins by writing the class identifier into the data stream (step 602), followed by writing the class version number (step 604) and the number of attributes for the class into the data stream (step 606). A loop is then entered in which each attribute of the class is processed. The next unwritten attribute of the class is determined (step 608). The attribute's version number is written to the data stream (step 610), and then the attribute's value is written to the data stream (step 612). A determination is then made as to whether or not any unwritten attributes remain to be processed (step 614). If so, then the process branches back to step 608 to process another unwritten attribute. Otherwise, if there are no unwritten attributes to be processed, then the serialization process is complete.

Figure 6B:
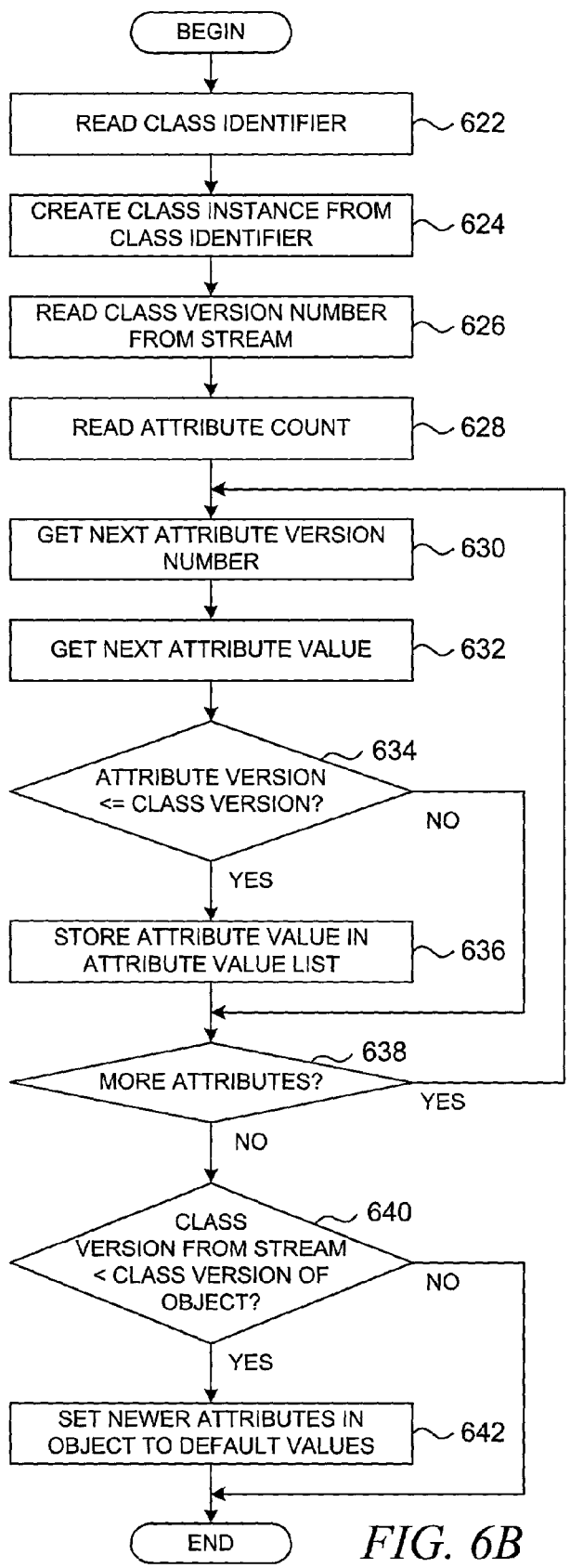
FIG. 6B is a flowchart depicting a deserialization process in accordance with a preferred embodiment of the present invention.

With reference now to FIG. 6B, a flowchart depicts a deserialization process in accordance with a preferred embodiment of the present invention. At some point in time, a "readObject( )" method is invoked to deserialize an object from a particular flattened object data stream, as described with respect to FIG. 5 above. The deserialization process begins by reading the class identifier from the data stream (step 622), after which an instance of the class is created using the class identifier (step 624). The version number of the class of the flattened object is then read from the data stream (step 626), which is used for subsequent comparisons.

The number of attributes for the object is then read from the data stream (step 628), which is then used as a control variable to loop through the remaining attributes in the data stream for the current object (steps 630–638). It should be noted that the attribute count was not depicted in FIGS. 4A–4D, and other equivalent indicators could be inserted into the data stream to control the demarcation of the attributes for the current object within the data stream.

For each attribute, the attribute version number is read (step 630), followed by the attribute value for the attribute (step 632). A determination is then made as to whether the version number of the attribute is less than or equal to the version number of the class for the newly instantiated object (step 634). If the version number of the attribute is indeed less than or equal to the version number of the newly instantiated object, then the attribute value that has been read from the data stream is added to the list of attribute values to be assigned to the attributes within the newly instantiated object (step 636). If the version number of the attribute is greater than the version number of the class for the newly instantiated object, then the attribute may be ignored, and the loop continues. In either case, a determination is then made as to whether or not there are more attributes in the serialized data stream to be processed (step 638). If so, then the process branches back to step 630; otherwise, the process continues.

After the process has looped through all of the attributes in the data stream, then a determination is made as to whether or not the version number of the flattened object that was read from the data stream is less than the class for the newly instantiated object (step 640). If not, then the process is complete; if so, then the process sets all of the newer attributes to a default attribute value (step 642), which may require a controlled loop through a set of attributes, after which the process is complete.

As shown above, the present invention uses customized serialization and deserialization methods to control the input and output of attribute values to and from a serialized data stream. As mentioned briefly above, these customized methods use an implicit ordering to identify the attribute values in a preferred embodiment. Alternatively, the serialization and deserialization methods may input and output identifiers with the attribute values so that an implicit ordering is not required. By adding attribute identifiers into the stream, one increases the robustness and opportunity for checking for errors within the data stream, at the expense of increasing the size of the data stream. This is a trade-off that should be considered within the constraints of the system.

To ensure that an implicit ordering mechanism operates correctly, the serialization method and the deserialization method, e.g., "writeObject( )" and "readObject( )", would read and write attribute values in the same order.

In order to ensure that the implicit ordering mechanism operates in a straightforward manner, new attributes that are added to subsequent versions of a class could be represented within a serialized data stream by appending those values at the end of a data stream. In addition, when a software developer desires to discard an attribute from a class, the attribute is not entirely removed from all operations with respect to the data stream. Instead, an empty placeholder continues to be written and read from the data stream to ensure compatibility between differing versions of the serialization and deserialization methods that are using an implicit ordering mechanism. In this way, the data attributes are not truly removed from the class, but rather, those attributes cease to be utilized within the application.

For example, in the description of FIGS. 4C–4D above, Version 1 of the Person class differed from Version 2 of the Person class with the inclusion of a "middleName" attribute in Version 2, and this attribute was inserted into the data stream between other Version 1 attributes. If the present invention were to be implemented through the use of an implicit ordering mechanism, the "middleName" attribute would be appended at the end of the data stream. The implicit ordering mechanism is shown in more detail below with respect to the remaining figures.

Figure 7A:
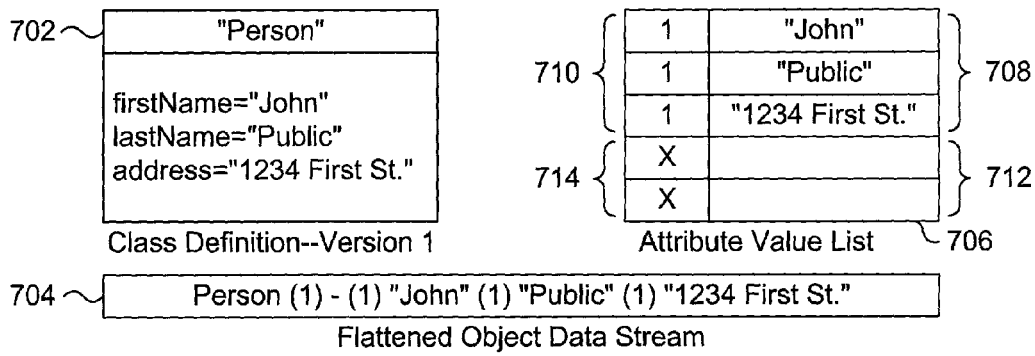
FIGS. 7A–7D are diagrams depicting evolving versions of the Person class in conjunction with serialized data streams and an attribute value list that may be used as a data structure to assist with interpreting the implicit ordering of a data stream in accordance with a preferred embodiment of the present invention.

With reference now to FIGS. 7A–7D, a set of diagrams shows evolving versions of the Person class in conjunction with serialized data streams and an attribute value list that may be used as a data structure to assist with interpreting the implicit ordering of a data stream in accordance with a preferred embodiment of the present invention. Referring to FIG. 7A, object 702 is structured in accordance with Version 1 of the Person class in a manner similar to object 202 shown in FIG. 2A. Object 702 may represent a Version 1 Person object either prior to being flattened or after being inflated, while serialized data stream 704 represents the object after it has been flattened.

While either writing or reading object 702 from data stream 704, the attributes for object 702 may be stored within attribute value list 706, which may be implemented as a multidimensional array. Attribute value list 706 contains attribute values 708 and their associated version numbers 710. Empty attributes 712 and unused version numbers 714 may or may not be used within an attribute value list. Version numbers 710 may be statically defined within the serialization and deserialization methods.

Figure 7B:
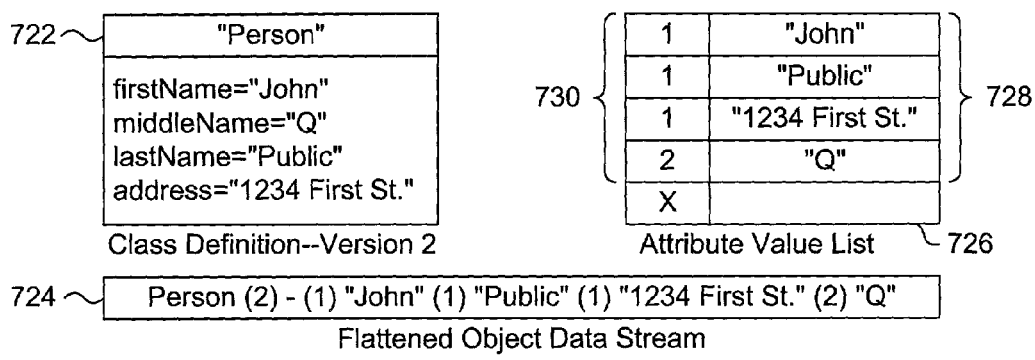

Referring to FIG. 7B, object 722 is structured in accordance with Version 2 of the Person class in a manner similar to object 206 shown in FIG. 2A. Object 722 may represent a Version 2 Person object either prior to being flattened or after being inflated, while serialized data stream 724 represents the object after it has been flattened.

While either writing or reading object 722 from data stream 724, the attributes for object 722 may be stored within attribute value list 726. Attribute value list 726 contains attribute values 728 and their associated version numbers 730. Version 2 of the Person class has added the "middleName" attribute, which is appended to the attribute value list. When changes are made to class to create a different version of the class, the software developer modifies the code for the serialization and deserialization methods in a manner such that the attribute values are stored and retrieved from the proper locations within the attribute value list.

Figure 7C:
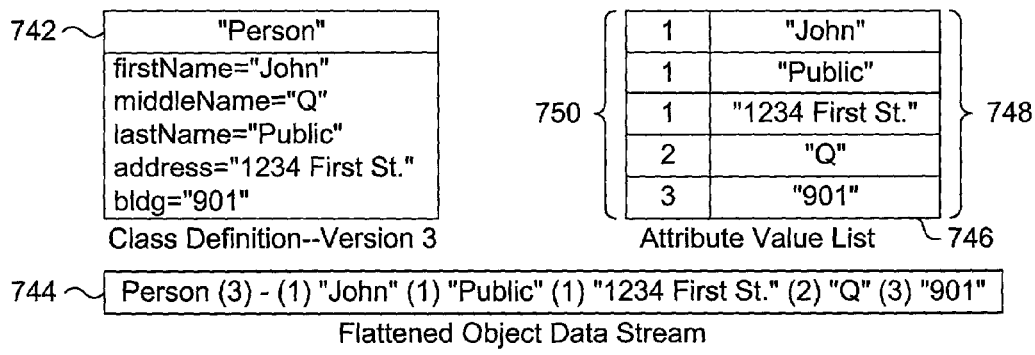

Referring to FIG. 7C, object 742 is structured in accordance with Version 3 of the Person class. Object 742 may represent a Version 3 Person object either prior to being flattened or after being inflated, while serialized data stream 744 represents the object after it has been flattened.

While either writing or read object 742 from data stream 744, the attributes for object 742 may be stored within attribute value list 746. Attribute value list 746 contains attribute values 748 and their associated version numbers 750. Version 3 of the Person class has added the "bldg" attribute to Version 2 of the Person class for specifying a building number, which is also appended to the attribute value list. As should be apparent, when new attributes are added to a class, they are stored within the data structure for the attribute value list such that an implicit ordering is maintained across versions of the class.

Figure 7D:
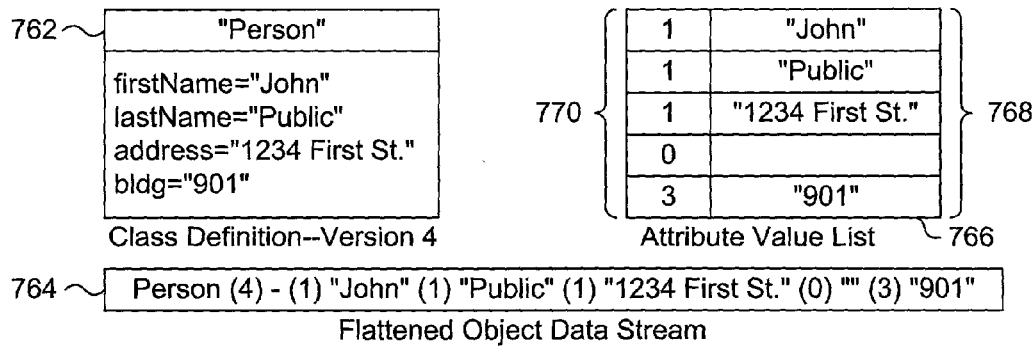

Referring to FIG. 7D, object 762 is structured in accordance with Version 4 of the Person class. Object 762 may represent a Version 4 Person object either prior to being flattened or after being inflated, while serialized data stream 764 represents the object after it has been flattened.

While either writing or read object 762 from data stream 764, the attributes for object 762 may be stored within attribute value list 766. Attribute value list 766 contains attribute values 768 and their associated version numbers 770. Version 4 of the Person class no longer contains the "middleName" attribute of the Person class. As should be apparent, when attributes are deleted from a class, the data stream and the data structure for the attribute value list retain a placeholder for the removed attribute such that an implicit ordering is maintained across versions of the class. In this example, version number 768 has been set to zero as a flag that the attribute has been removed.

By retaining placeholders for removed attributes, an implicit ordering is maintaining across versions of a class, and the deserialization method can readily map attributes between different versions of objects when there is a mismatch between a flattened object and the newly instantiated object that is being inflated using the values from the flattened object's data stream. When necessary, attributes can be given default values. It should be apparent to one of ordinary skill in the art that temporary data structures, such as an object array, can be employed to implement the process described above.

The advantages of the present invention should be apparent in view of the detailed description of the invention that is provided above. In the prior art, an error would be thrown when a version mismatch was detected between the flattened and the inflated data objects. In contrast, the present invention associates version numbers or version identifiers with each attribute and places the attribute version numbers into a flattened object's data stream. When the object is later read from the data stream, the attribute version numbers can be used to determine the manner in which the attribute values should be processed. Only those attribute values that are appropriate for the current class version are used for the new object, while missing attribute values can be set to default values. Hence, the present invention does not return an error when version mismatches are detected.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method of computer-implemented steps for object-oriented management of serializable objects, the method comprising:
   identifying an object, wherein the object comprises a set of attributes;
   associating a class version identifier with the object, wherein the class version identifier identifies the object as an instance of a specific version of a class;
   associating an attribute version identifier with an attribute in the set of attributes such that each attribute in the set of attributes is associated with an attribute version identifier;
   reading a data stream representing a serialized object, wherein the data stream comprises a serialized class version identifier, a set of attribute serialized attribute values, and a set of serialized attribute version identifiers, wherein serialized attribute version identifiers in the set of serialized attribute version identifiers are paired with serialized attribute values in the set of serialized attribute values;
   reading a class identifier for the serialized object from the date stream;
   instantiating the object in accordance with the class identifier, wherein the class version identifier of the object and the serialized class version identifier of the serialized object may differ;
   reading an attribute count for the set of serialized attribute values from the data stream;
   mapping attributes between the object and the serialized object; and
   storing serialized attribute values from the data stream in the object and in response to a determination that a serialized attribute version identifier is greater than or subsequent to the class version identifier of the object, refraining from storing in the object a serialized attribute value associated with the serialized attribute version identifier.

2. The method of claim 1 further comprising:
   in response to a determination that the class version identifier of the object is greater than or subsequent to the serialized class version identifier, storing default attribute values in the object for attributes in the object that are associated with an attribute version identifier that is greater than or subsequent to the serialized class version identifier.

3. A method of computer-implemented steps for providing backwards and forwards compatibility between different version of serialized object data, the method comprising:
   identifying an object, wherein the object comprises a set of attributes, wherein each attribute in the set of attributes is associated with a version identifier, and wherein the object is an instance of a first version of a class;
   writing a data stream representing a serialization of the object's attributes and associated version identifiers;
   reading a data stream representing a serialized object into a new object instance of a second version of a class; and
   refraining from storing attributes from the data stream into the new object instance that are not represented in the new object instance while reading the data stream.

4. The method of claim 3 further comprising:
   specifying default values for attributes in the new object instance for which attribute values were not read from the data stream.

5. A computer product on a computer readable storage medium for use in a data processing system for object-oriented management of serializable objects, the computer program product comprising:
   instructions for identifying an object, wherein the object comprises a set of attributes;
   instructions for associating a class version identifier with the object, wherein the class version identifier identifies the object as an instance of a specific version of a class;
   instructions for associating an attribute version identifier with an attribute in the set of attributes such that each attribute in the set of attributes is associated with an attribute version identifier;
   instructions for reading a data stream representing a serialized object, wherein the data stream comprises a serialized class version identifier, a set of serialized attribute values, and a set of serialized attribute version identifiers, wherein serialized attribute version identifiers in the set of serialized attribute version identifiers are a paired with serialized attribute values in the set of serialized attribute values;

instructions for reading a class identifier for the serialized object from the data stream;

instructions for instantiating the object in accordance with the class identifier, wherein the class version identifier of the object and the serialized class version identifier of the serialized object may differ;

instructions for reading an attribute count for the set of serialized attribute values from the data stream;

instructions for mapping attributes between the object and the serialized object; and instructions for storing serialized attribute values from the data stream in the object and instructions for refraining from storing in the object a serialized attribute value associated with the serialized attribute version identifier in response to a determination that a serialized attribute version identifier is greater than or subsequent to the class version identifier of the object.

6. The computer program product of claim 5 further comprising:

instructions for storing default attribute values in the object for attributes in the object that are associated with an attribute version identifier that is greater than or subsequent to the serialized class version identifier in response to a determination that the class version identifier of the object is greater than or subsequent to the serialized class version identifier.

7. A computer program product on a computer readable storage medium for use in a data processing system for providing backwards and forwards compatibility between different version of serialized object data, the computer program product comprising:

instructions for identifying an object, wherein the object comprises a set of attributes, wherein each attribute in set of attributes is associated with a version identifier, and wherein the object is an instance of a first version of a class;

instructions for writing a data stream representing serialization of the object's attributes and associated version identifiers;

instructions for reading a data stream representing a serialized object into a new object instance of a second version of a class; and instructions for refraining from storing attributes from the data stream into the new object instance that are not represented in the new object instance while reading the data stream.

8. The computer program product of claim 7 further comprising:

instructions for specifying default values for attributes in the new object instance for which attribute values were not read from the data stream.

9. An apparatus for object-oriented management of serializable objects, the apparatus comprising:

means for identifying an object, wherein the object comprises a set of attributes;

means for associating a class version identifier with the object, wherein the class version identifier identifies the object as an instance of a specific version of a class;

means for associating an attribute version identifier with an attribute in the set of attributes such that each attribute in the set of attributes is associated with an attribute version identifier;

means for reading a data stream representing a serialized object, wherein the data stream comprises a serialized class version identifier, a set of serialized attribute values, and a set of serialized attribute version identifiers, wherein serialized attribute version identifiers in the set of serialized attribute version identifiers are paired with serialized attribute values in the set of serialized attribute values;

means for reading a class identifier for the serialized object from the data stream;

means for instantiating the object in accordance with the class identifier, wherein the class version identifier of the object and the serialized class version identifier of the serialized object may differ;

means for reading an attribute count for the set of serialized attribute values from the data stream;

means for mapping attributes between the object and the serialized object; and means for storing serialized attribute values from the data stream in the object and means for refraining from storing in the object a serialized attribute version identifier in response to a determination that a serialized attribute version identifier is greater than or subsequent to the class version of the object.

10. The apparatus of claim 9 further comprising:

means for writing a data stream representing an object serialization of the object, wherein the data stream comprises the class version identifier of the object, an attribute value for an attribute in the set of attributes, and an attribute version identifier for an attribute in the set of attributes.

11. An apparatus for providing backwards and forwards compatibility between different versions of serialized object data, the apparatus comprising:

means for identifying an object, wherein the object comprises a set of attributes, wherein each attribute in the set of attributes is associated with a version identifier, and wherein the object is an instance of a first version of a class;

means for writing a data stream representing serialization of the object's attributes and associated version identifiers;

means for reading a data stream representing a serialized object into a new object instance of a second version of a class; and means for refraining from storing attributes from the data stream into the new object instance that are not represented in the new object instance while reading the data stream.

* * * * *